(12) United States Patent
Cochlovius et al.

(10) Patent No.: US 7,096,118 B2
(45) Date of Patent: Aug. 22, 2006

(54) ERGONOMIC MAP INFORMATION SYSTEM

(75) Inventors: Elmar Cochlovius, Villingen-Schwenningen (DE); Günther Huber, Bad Dürheim (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 11/015,142

(22) Filed: Dec. 17, 2004

(65) Prior Publication Data

US 2005/0182560 A1 Aug. 18, 2005

Related U.S. Application Data

(63) Continuation of application No. PCT/EP03/06262, filed on Jun. 13, 2003.

(30) Foreign Application Priority Data

Jun. 17, 2002 (DE) ................. 102 26 885

(51) Int. Cl.
*G01C 21/36* (2006.01)
(52) U.S. Cl. .................................... 701/208
(58) Field of Classification Search ............... 701/200, 701/208, 211; 345/27, 530; 340/990.18, 340/995.18
See application file for complete search history.

(56) References Cited

U.S. PATENT DOCUMENTS 4,873,513 A * 10/1989 Soults et al. ............... 345/27

5,777,069 A 7/1998 Coquelet et al.
2003/0107499 A1 * 6/2003 Lepere et al. ............... 340/945

FOREIGN PATENT DOCUMENTS

| FR | 2668637 | 4/1992 |
|---|---|---|
| FR | 2768507 | 3/1999 |
| WO | WO 89/06851 | 7/1989 |
| WO | WO 03/107312 A2 | 12/2003 |
| WO | WO 2003/107312 A3 | 12/2003 |

* cited by examiner

*Primary Examiner*—Yonel Beaulieu
(74) *Attorney, Agent, or Firm*—Brinks Hofer Gilson & Lione

(57) ABSTRACT

A system for the ergonomic communication of a map portion is presented. The map portion may include map information, map background, and additional information. The system includes an interface control unit that may include a graphics control unit, a processor and a memory. The system may include one or more modules for creating an ergonomic presentation including: a border module that may add the additional information to the representation; an adaptation module for adapting the map information and map background and/or additional information with one another, such as within a maximum color contrast; a scale-dependent module that may adapt the color intensity and width of map information as a function of scale and type; and a smoothing module to increase the quality of the map portion representation. The system may include a method for controlling the representation of a map portion.

23 Claims, 3 Drawing Sheets

ERGONOMIC MAP INFORMATION SYSTEM

PRIORITY CLAIM

This application is a continuation of pending PCT Application No. PCT/EP03/06262, filed Jun. 13, 2003, which claims priority based on German Patent Application No. 102 26 885.1, filed Jun. 17, 2002. PCT Application No. PCT/EP03/06262 and German Patent Application No. 102 26 885.1 are incorporated herein by reference in their entirety.

BACKGROUND OF THE INVENTION

1. Technical Field

The present invention relates to a system for the ergonomic representation of a map.

2. Related Art

Systems for presenting map information ("map information systems"), such as those that electronically present map information to a driver of a vehicle, may include a color thin film transistor ("TFT") display for representing street maps, and an integrated navigation system for localizing the vehicle relative to the map. Map information systems may present maps or portions of maps (individually and collectively referred to in this document as "map portions"). These systems may represent map portions according to user or other requirements, and may represent the maps in various views. These views may include, the area surrounding a destination, a route, or the user's current position. Further, map information system may represent the map portion in a variety of scales.

In contrast to printed maps, map information systems may calculate map portions in real time from abstract map data that may be stored in a memory. Map information systems may produce representations of a map portion from the smallest possible number of primitive basic elements (collectively "map data"). Therefore, the representation may appear very coarse. Streets may be represented by simple lines, independent from the scale of the map portion, and may include labels or street names. These labels or street names generally include alpha-numeric characters oriented along a horizontal line or a continuous tangent independently of the orientation and the shape of the associated street. Therefore, map information systems may produce representations of map portions that appear very coarse and simple when compared with printed maps. As a result, an excessive percentage of the user's attention may be devoted to interpreting the representation, and the user may not be able to grasp the map information intuitively. These issues are compounded when the map information system is used by the driver of a vehicle.

SUMMARY

A system for the ergonomic representation of maps or portions of maps ("ergonomic map information system") is presented. The ergonomic map information system may produce a representation of a map or portion of a map (individually and collectively referred to in this document as "map portions") that may be intuitively understood by a user. The ergonomic map information system may include an interface, and an interface control unit. The interface control unit may include a processor, a memory, and a graphics control unit. The processor may control the operation of the ergonomic map information system. The interface may communicate the map portions with a user, and the graphics control unit may provide support to the interface by providing faster processing of graphic data.

The memory may include a data module that may store primitive basic elements (collectively "map data") that may be used to calculate map portions. The map data may include map contents. Map contents may include map backgrounds, map information, and/or additional map information. Map information may include roads, such as highways, country roads, and city streets. Additional map information may include labels, information symbols, and basic map information. Further, the memory may include modules for producing an ergonomic representation of a map portion. These modules may include a scale-dependent module, a border module, a smoothing module, and an adaptation module in any combination. These modules may be implemented in computer-readable software and/or encoded in a computer-readable electromagnetic signal.

The adaptation module may select colors with which to represent map contents. To avoid creating an undesirably strong color contrast between the colors of the background and the map information, the adaptation module may select colors for the map information and the background whereby the color of one of the map contents (such as map information or background) is selected dependent on the color of another of the map contents. For example, the adaptation module may automatically select colors for the map information and the background that are separated by no more than about 120 degrees on a hue circle. The adaptation module may select colors for additional information, such as road borders, which are located between the color of the map information and the color of the background on the hue circle. Further, the adaptation module may select a color for the additional information that is closer to the color of the map information than to the color of the map background on the hue circle. This allows the additional information to be perceived as associated with the map information. Further, the adaptation module may select colors for map information and additional information based on their type and/or relative importance.

The adaptation module may adapt the color of map information to that of the background. For example, with a given background color, the adaptation module may automatically select the color of map information relative to the background color. In this manner, the color of the map information is dependent on the background color. Similarly, for a give map information color, the adaptation module may automatically select the color of background relative to the map information color. In addition, the adaptation module may adapt the color of additional information, such as road borders, to the background and/or to map information. For example, the adaptation module may automatically select the color of road borders relative to the background color and/or the map information. In this manner, the color of additional information, such as road borders, may be dependent on the background color and/or the map information. The adaptation module may select a color for the additional information, such as road borders, that does not create a strong contrast with the color the map information, such as a road, or the background. The adaptation module may adapt additional information, such as labels to map information or other additional map information. For example, orientation of road labels may be selected dependent on the road that they label. The orientation of the road label may be adapted to follow the course of, or be placed on top of, the road that they label.

The scale-dependent module may use scale-dependent color compensation, and/or scale-dependent road width variation to adapt the representations of roads and road borders so that they may be intuitively discernable by a user. Scale-dependent road width variation may include adjusting the width of map information, such as roads, according to road type and/or the scale of the map portion. Scale-dependent color compensation may include representing a type of map information with a uniform color. Further scale-dependent color compensation may include altering the intensity of a type of map information so that all map information of a given type may be subjectively perceived as uniform. For example, scale-dependent color compensation may increase the intensity of thin line representations of map information so that the thin line representations may be perceived as subjectively uniform with thick line representations of the same road type. Further, the scale-dependent color compensation may maintain or adapt the color impression of a road type with the scale of the represented map portion.

The border module may provide additional map information to the representation of a map portion. For example, additional map information may include information relating to roads and/or road borders. Road borders may make roads more visible because road borders define a kind of visual channel that may prevent the user's eyes from wandering. The border module may make the additional map information a function of the type of map information and/or scale of the map portion, which may make certain road types more distinguishable.

The smoothing module may improve the readability of map contents by smoothing the color transitions among map content elements. For example, anti-aliasing may be used to reduce the stair-step effect caused by a pixel-based display. Anti-aliasing may include mixing the foreground and the background colors of the pixels located in the transition area from one color to another color, and may be used to smooth color transitions between map information and additional map information, and/or between additional map information and the background The ergonomic map information system may include a method for controlling the representation of a map portion. This method may include obtaining the needed data, representing the background, representing roads, adding labels, and representing the map portion.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
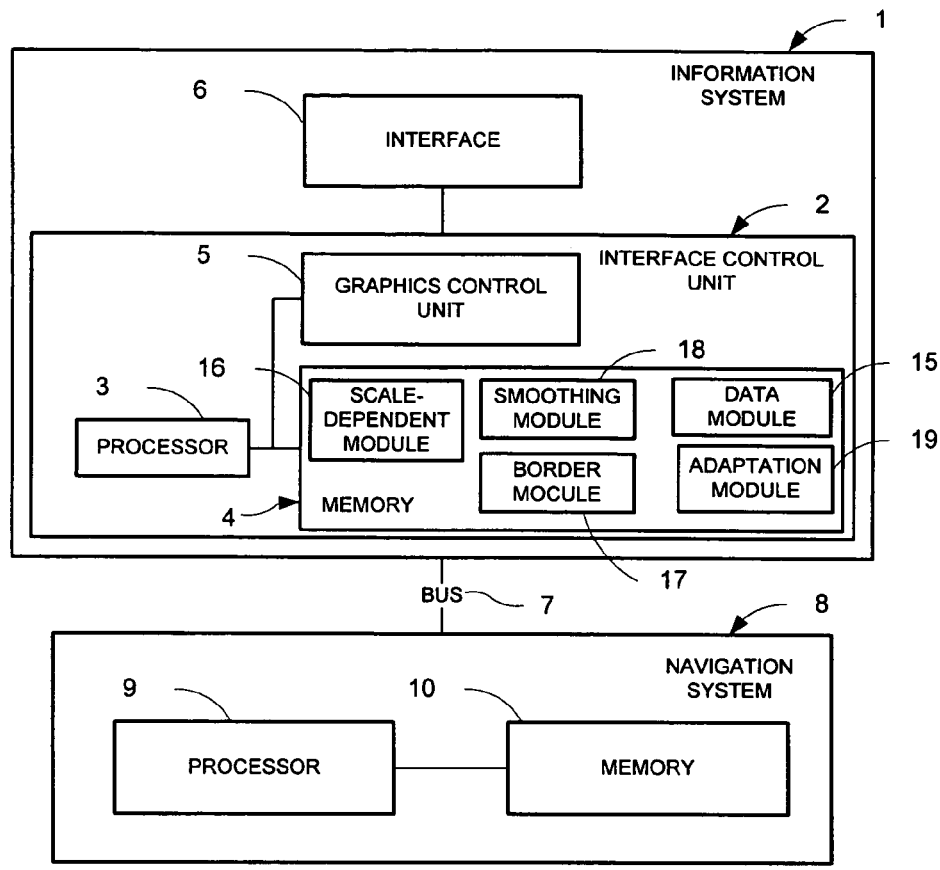
FIG. 1 is a block diagram of an ergonomic map information system coupled with a navigation system.

FIG. 1 depicts a system for the ergonomic representation of maps and/or portions of maps ("ergonomic map information system") 1 in communication with a navigation system 8. The ergonomic map information system 1 may produce a representation of a map or portion of a map that may be intuitively understood by a user. The resulting map or map portion representation may increase the usefulness of the map or map portion. Further, if the ergonomic map information system 1 is implemented and used in a vehicle, the resulting ergonomic map representation may be less distracting for the driver. The ergonomic map information system 1 may include an interface 6, and an interface control unit 2. The interface control unit 2 may include a processor 3, a memory 4, and a graphics control unit 5 for controlling the interface 6. The processor 3 may control the operation of the ergonomic map information system 1. The interface 6 may communicate the map portions with a user. The graphics control unit 5 may provide support to the interface 6 by providing faster processing of graphic data.

The interface 6 may include one or more input devices and/or one or more output devices (not shown). Output devices may include any type of visual, manual, audio, or electromagnetic device capable of communicating information from a processor or memory to a user or other processor or memory. Examples of output devices include, but are not limited to, monitors, speakers, liquid crystal displays, networks, buses, and interfaces. The input device may be any type of visual, manual, mechanical, audio, or electromagnetic device capable of communicating information from a user or memory to a processor or memory. Examples of input devices include keyboards, microphones, voice recognition systems, trackballs, mice, networks, buses, and interfaces. Alternatively, the input and output devices may be included in a single device such as a touch screen, computer, processor or memory coupled with the processor via a network or bus.

The memory 4 may include a data module 15. The data module 15 may store primitive basic elements (collectively "map data") that may be used by the processor 3 to calculate maps or map portions (individually and collectively referred to in this document as "map portions"). The map data may include map contents that include map backgrounds, map information, and/or additional map information. The map data may further include information indicating the way in which the map contents are to be represented. Map information may include roads, such as highways, country roads, and city streets. Additional map information may include labels, information symbols, and basic map information. Basic map information may include scales and directional arrows.

The ergonomic map information system 1 may be in communication with a navigation system 8 via a bus 7 or other electromagnetic coupling. The navigation system 8 may include a processor 9 and a memory 10. The navigation system 8 may obtain, or generate map data, which the navigation system 8 may store in the memory 10. The navigation system 8 may also store data obtained from or used to communicate with a global positioning system ("GPS") in the memory 10. If the navigation system 8 and ergonomic map information system 1 are used in a vehicle, the navigation system 8 may obtain and store data relating to wheel positions, distance traveled, and the like.

Memories 4 and 10 may include any type of fixed or removable digital storage device and, if needed, a device for reading the digital storage device including, floppy disks and floppy drives, CD-ROM disks and drives, optical disks and drives, hard-drives, RAM, ROM and other such devices for storing digital information. The processors 3 and 9 may include any type of device or devices used to process digital information.

The memory 4 of the ergonomic map information system 1 may include modules for producing an ergonomic representation of a map portion. These modules may, alternatively, be included in the processor 3 or any external memory or processor. These modules may include one of or any combination of a scale-dependent module 16, a border module 17, a smoothing module 18, and an adaptation module 19. The scale-dependent module 16, border module 17, smoothing module 18, and adaptation module 19 may be implemented in independent modules (as shown in FIG. 1), or combined in one or more modules. The scale-dependent module 16, border module 17, smoothing module 18, and adaptation module 19 may be implemented in computer-readable software code that may be executed by the processor 3. Alternatively, the software code may be encoded in a computer-readable electromagnetic signal. The code may include source code, object code or any other code performing or controlling the functionality described in this document.

Examples of the scale-dependent module 16, border module 17, smoothing module 18, and adaptation module 19 will be discussed in connection with FIGS. 2 through 7. FIGS. 2 through 7 illustrate representations of map portions. For purposes of illustration, some of the color values include various shades of gray, while some of the color values are represented by varying degrees of shading. In addition to the representation of various items of map information, including roads, such as highways 21, 22, country roads 23, 24 and city streets 25, 26, FIGS. 2 through 7 also include example representations of additional map information, including labels 27, information symbols for gas stations, highway exits and the like 28, and a scale and directional arrow 29.

The scale-dependent module 16 may adapt the representations of roads and road borders so that they may be intuitively discernable by a user. The scale-dependent module 16 may make such adaptations using one or more of the following: scale-dependent color compensation, and scale-dependent road width variation. The scale-dependent module 16 may use scale-dependent color compensation to adapt map information to the map background. Scale-dependent color compensation may represent a class or type of map information, such as a road type, with a uniform color. Further, scale-dependent color compensation may alter the intensity of a class or type of map information so that all map information of a given type will be subjectively perceived as uniform. For example, a given road type, such as a highway, may be represented by both thin lines and by thick lines of the same color against a contrasting background. In this case, the thin line will be perceived as much paler than the thick lines. So that both the thin line and thick line representations of the same road type may be subjectively perceived as uniform, scale-dependent color compensation may increase the intensity of the thin lines. For example, thinner elements of the map information may be represented with a comparatively more intensive color than thicker elements. Further, because a user may associate a specific road type with a subjectively perceived road color, the scale-dependent color compensation may maintain the color impression of a road type over the entire scale range independently of the road width. For example, when represented on a large scale, a road should be represented thinly and in a strong color, whereas in the case of a smaller scale of enlargement the same road will be represented more broadly and in a weaker color.

Figure 6:
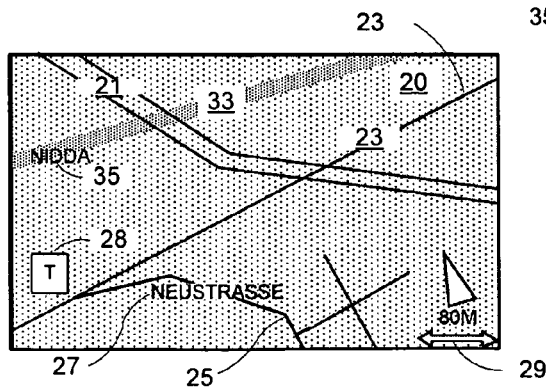
FIG. 6 is a diagram of representation of a map portion created without using road color intensity adaptation.
Figure 7:
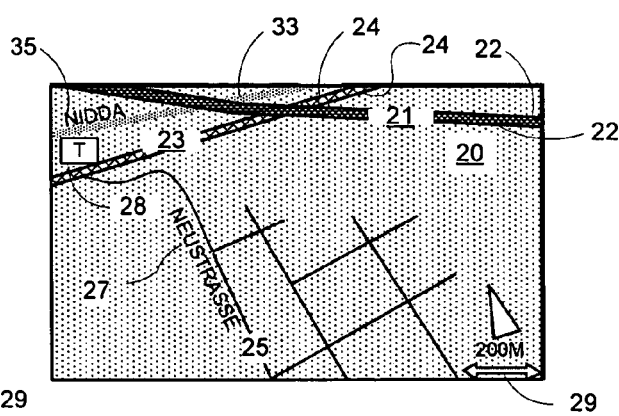
FIG. 7 is a diagram of representation of a map portion created using road color intensity adaptation.

Scale-dependent color compensation may include choosing color relationships such that, when the scale of the map portion increases, the representation of map information, such as a road, will become relatively stronger. Because the numerical scale (such as that identified by reference number 29) displayed along with many map portions is often not large enough to be easily discerned from a cursory glance (for example, while the vehicle is in motion), optically effective road width may influence the orientation of a user. Further, intensity affects the optically effective road width, which may have an effect on user orientation. Therefore, scale-dependent color compensation may adapt the color intensity of the roads. An example of this is shown in FIGS. 6 and 7. FIGS. 6 and 7 show the same map portion. However, FIG. 7 is set to a higher scale that is FIG. 6. Therefore, in this example, roads 21 and 23 have greater color intensity in FIG. 7 than they do in FIG. 6.

Figure 2:
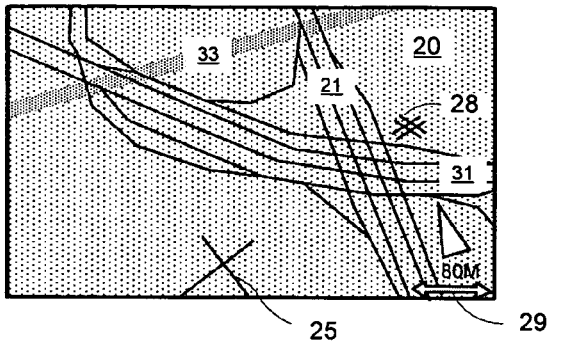
FIG. 2 is a diagram of a representation of a map portion created using scale-dependent color compensation.
Figure 3:
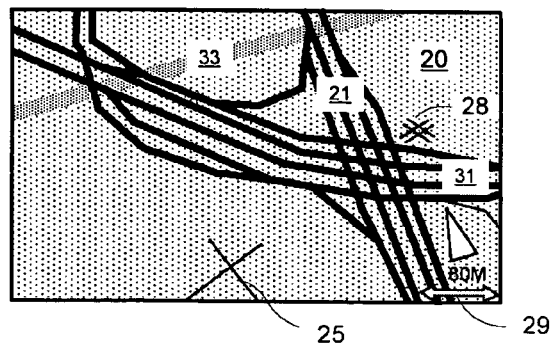
FIG. 3 is a diagram of representation of a map portion created using scale-dependent road width variation.

The scale-dependent module 16 may use scale-dependent road width variation to adjust the width of roads according to the type of road and/or the scale of the map portion. For example, scale-dependent road width variation may assign a particular width to a particular type of map information. An example of this may be seen by comparing FIG. 2 with FIG. 3. Various roads 21, 31, 33 are shown against a uniform or a weakly structured map background 20. In FIG. 2, a representation of a map portion created without scale-dependent road width variation is shown. In the example of FIG. 2, all roads are represented with uniform width lines. In FIG. 3, a representation of the map portion of FIG. 2, created using scale-dependent road width variation, is shown. In this example, scale-dependent road width variation assigns a particular line width to a certain road type-highways 21 and 31. Further, scale-dependent road width variation may include assigning different widths to different types of roads, such as highways and secondary roads. In another example, scale-dependent road width variation may include assigning different widths to interstate roads or city streets and country roads.

Further, scale-dependent road width variation may include maintaining the width of roads as the scale of the map portion changes. For example, a road may be represented with a width of 1 mm on a city map using a scale of 1:1,000 and on a map using a scale of 1:5,000. Further, scale-dependent road width variation may include altering road widths as a function of the scale of the map portion. For example, when a map portion is set to a scale of 1:1000, the road width may be 1 mm. However, when the same map portion is set to a scale of 1:5,000, the road width may be 0.5 mm.

The border module 17 may add additional map information to the representation of a map portion. This additional map information may include information relating to highways and/or road borders. For example, in the map portion representation of FIG. 5, road 21 includes road borders 22, and road 23 includes road borders 24. Road borders may make roads more visible because road borders 22 and 24 define a kind of visual channel that may prevent the user's eyes from wandering. Thus, road borders allow a user to intuitively discern the course of the roads. In addition, the border module 16 may make the additional map information, such as road borders, a function of the road type and/or scale of the map portion. For example, when the map portion is presented using a small scale, road borders may be included with certain types of roads, such as highways and interstate roads, so that these road types may be detected and distinguished more easily. In another example, road borders may be included with secondary roads and/or city streets only when the map portion is presented using at least a predetermined scale, such as at least a large scale.

Figure 5:
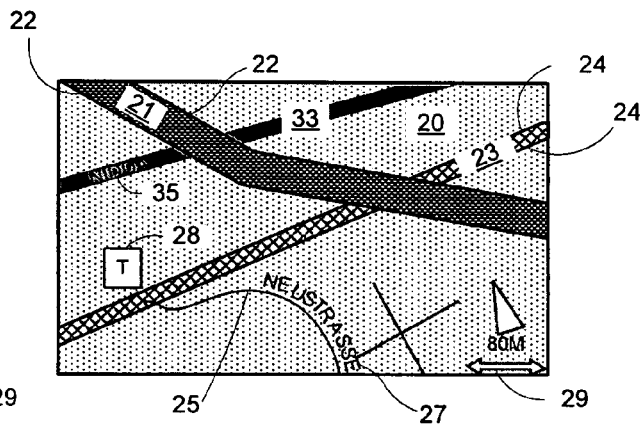
FIG. 5 is a diagram of representation of a map portion created using smoothing and adapting labels to roads s.

When representations of map portions are communicated to a user using individual picture elements or pixels (such as those of a TFT display), the generally rectangular pixels may create disturbing stair-step artifacts that impair the readability of the map contents. The smoothing module 18 may be used to improve the readability of the map contents by smoothing the color transitions among elements of the map contents. For example, color transitions between map information and additional map information, and/or between additional map information and the background may be smoothed. Because pixels have a discernible size, the smoothing module 18 may effectively reduce the stair-step effect using suitable color mixing or anti-aliasing. Anti-aliasing may include mixing the foreground and the background colors of the pixels located in the transition area from one color to another color. Anti-aliasing may be used to smooth the color transitions between map information, such as a road, and additional information, such as, road borders. An example of this is shown in FIG. 5. FIG. 5, illustrates a representation created using anti-aliasing to smooth the transitions between road 21 and road borders 22. In addition, transitions between road borders and the background may be smoothed.

The smoothing module 18 or portions of the smoothing module 18 may be implemented in hardware. For example, the graphics control unit 5 may include an anti-aliasing function, which may provide a hardware implementation of the smoothing module. This anti-aliasing function may effectively reduce the burden on the processor 3, thus reducing the time required to compute the map portion. However, the time required to calculate a representation of a map portion may still be relatively high.

The adaptation module 19 may select colors for the map information and the background whereby the color of one of the map contents (such as map information or background) are selected dependent on the color of another of the map contents. For example, the adaptation module 19 may select the color of map information, such as roads, to that of the background. The hardware anti-aliasing provided by graphics control units may not be optimal because mixing between foreground and background colors takes place only in a small number of steps. As a result, transitions between strongly contrasting colors, such as complementary colors, may still include stair-step artifacts in spite of hardware anti-aliasing. Hence, transitions of related colors may be smoothed to achieve higher ergonomic quality representations of map portions.

In addition, the adaptation module 19 may adapt the color of additional information, such as road borders, to the background and/or to map information. For example, the adaptation module 19 may adapt the color of the road borders to the background and to map information, such as roads. A bordered road may include two color transitions on either side. The first color transition takes place between the road and the road borders, and the second color transition takes place between the road border and the background. The adaptation module 19 may select a color for the additional information, such as road borders, that does not create a strong contrast with the color the map information, such as a road, or the background. In this manner, the color of additional information, such as road borders, may be dependent on the background color and/or the map information.

Figure 4:
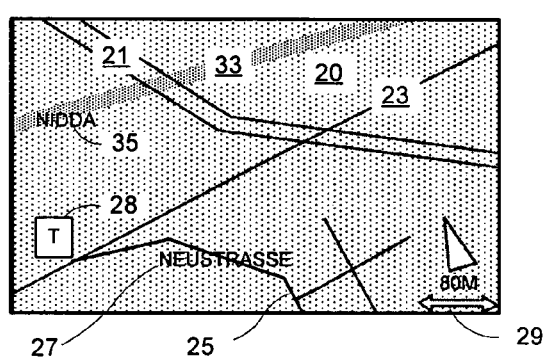
FIG. 4 is a diagram of representation of a map portion created without using smoothing or adapting labels to roads.

The adaptation module 19 may adapt additional information, such as labels to map information or other additional map information. For example, orientation of road labels may be selected dependent on the road that they label. The orientation of the road label may be adapted to follow the course of the road that they label. Thus, the road label may be curved (see FIG. 5), may be straight across, may be top to bottom, or may be oriented at an angle (see FIG. 7). Examples of map portion representations created without such an adaptation are shown in FIGS. 4 and 6. In these Figures, the labels "Nidda" 35 and "Neustrasse" 27 for roads 33 and 25, respectively, include straight tangential or Cartesian lettering. In contrast, examples of map portion representations created using adaptation are shown in FIGS. 5 and 7. In these Figures, the labels "Nidda" 35 and "Neustrasse" 27 are adapted to follow the course of road 33 and road 25, respectively. In addition, the adaptation module 19 may orient each character of the labels 35 and 27 orthogonally to the tangent of that letter's point of contact with road 33 and 25, respectively. Further, if the road width is sufficient, the adaptation module 19 may place road labels on top of the road representation. In addition, the adaptation module 19 may place road labels on top of road representations when the scale of the map portion representation results in sufficiently wide roads.

The adaptation module 19 may select colors for the map information and the background whereby the color of one of the map contents (such as map information or background) is selected dependent on the color of another of the map contents. For example, the adaptation module 19 may select the color of the map information, such as a road, to the color of the map background within a maximum color contrast, which may be predetermined, so that the map information may be clearly visible without creating an irritatingly strong color contrast. When gray values are used, gray values which correspond to the gray levels of the corresponding color values may be chosen. In addition, a coloring which has been adapted with respect to color intensity may be used for the additional items of information. In this manner, the color of the map information may be automatically selected to be dependent on the map background. For example, if one aspect of the map (background and/or map information) may be customized, the adaptation module may select colors of other aspects of the map which are dependent on the customized color. For example, if the background color may be customized to a particular color, the adaptation module 19 may select the colors for the map information since the colors of the map information may be selected relative to the color of the background information.

To avoid creating an undesirably strong color contrast between the colors of the background and the map information, the adaptation module 19 may select colors for the map information and the background that are separated by no more than about 120 degrees on a hue circle. For example, if the color of the background is blue, the adaptation module 19 may select either red or yellow because both are located about 120 degrees from blue on the hue circle. The adaptation module 19 may select colors for additional information, such as road borders, which are located between the color of the map information and the color of the background on the hue circle. Further, the adaptation module may select a color for the additional information that is closer to the color of the map information than to the color of the map background on the hue circle. This allows the additional information to be perceived as associated with the map information.

The adaptation module 19 may select colors for map information and additional information based on their type and/or relative importance. Starting from a selected point on the hue circle or from the color of the background, colors for primary map information, such as roads 21, of a given type may be chosen in a weighted or ordered manner along one direction of the hue circle. This may be used, for example, to differentiate among city streets, country roads, and interstate highway. Further, colors may be chosen from two different sides of the hue circle, starting again from a selected point or from the color of the background to emphasize particularly important map information, such as, highways over other types of roads, or roads over street names and/or other information.

Figures 8, 9:
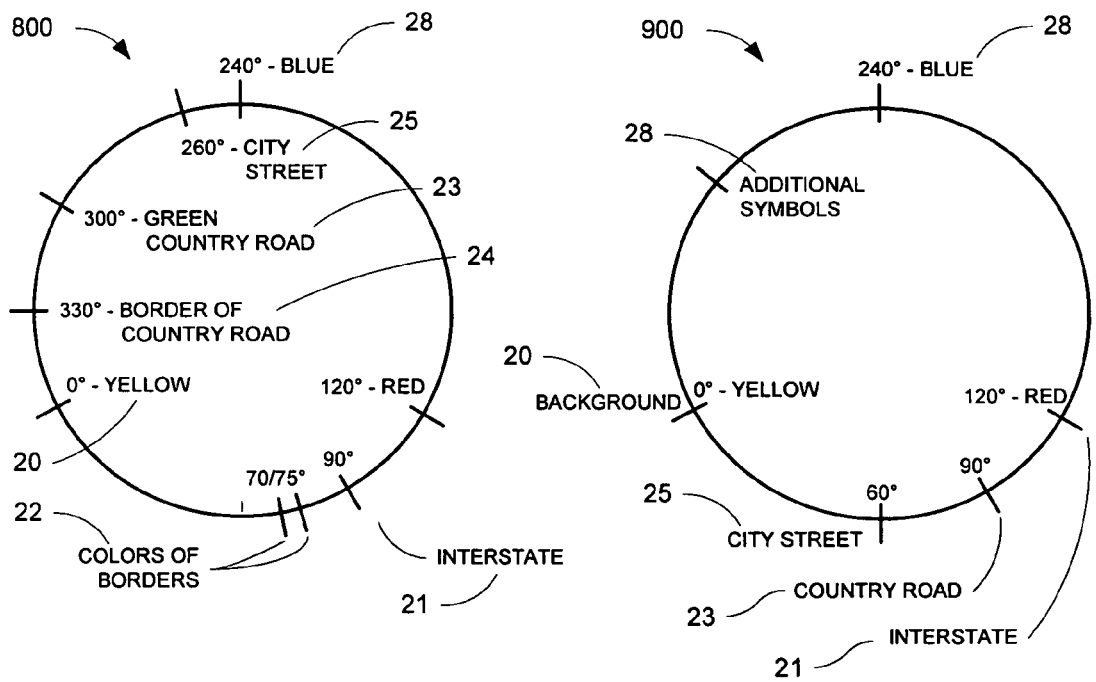
FIG. 8 is a hue circle diagram of an assignment of colors to different items of map information.
FIG. 9 is a hue circle diagram of another assignment of colors to different items of map information.

An example of how an ergonomic map information system (such as that shown in FIG. 1) may select colors to represent the contents of a map portion will be explained with reference to the hue wheel 800 of FIG. 8. In hue wheels, the color spectrum is represented by angles ranging from 0 to 360 degrees, and the background color is associated with color position 0 degrees. In this example, the color yellow is chosen for the background 20. Therefore, the 0 degree position is set to correspond to yellow. As a result, the color red is located at 120 degree position, and the color blue at 240 degree position. In general, a color that is clearly different from the color chosen to represent other roads and background may be chosen to represent interstate highways 21. In the present example, the color chosen to represent interstate highways 21 is the color red-orange, which is located at 90 degrees on the hue wheel 800. For the road borders, the graded orange colors at 70 degrees and 75 degrees are chosen because they are located between the color for background 20 and the color interstate highways 21 on the hue wheel. Because road borders 22 may be regarded as part of interstate highways 21, the color selected for the road borders 22 may be located more closely to that of the intestate highway 21 than that of background 20.

Starting from the background color at 0 degrees, the colors for other roads may be chosen from the other side of the hue circle. In this example, the following are selected: a green hue at 300 degrees for country roads 23, a green-yellow hue at 330 degrees for the borders of the country roads, and a blue-green hue at 260 degrees for city streets. Further, the color blue at 240 degrees is assigned to additional information symbols 28, which may include gas station symbols. Alternatively, additional symbols 28 and basic map information symbols 29 may be depicted by a black-and-white representation. As shown in FIG. 8, some of the roads, such as country roads, are on one side of the background on the hue wheel 800, and some of the roads, such as interstate, are on the other side of the background on the hue wheel 800.

Another example of how an ergonomic map information system (such as that shown in FIG. 1) may select colors to represent the contents of a map portion will be explained with reference to the hue wheel 900 of FIG. 9. In this hue wheel 900, the background color is associated with color position 0 degrees. For example, as shown in FIG. 9, the color chosen for the background may be yellow. Further, colors for the various types of roads may be distributed over a color spectrum range of up to about 120 degrees. In this example, the color chosen for city streets is the color at 60 degrees, for country roads, the color at 90 degrees, and for interstate highways, the color at 120 degrees. For the additional symbols and street names, colors of a different sector of the hue circle may be chosen. Alternatively, the colors chosen to represent additional symbols and street names may be the same as those chosen for the streets to which they are associated. In the present example, the colors selected for the various roads 21–26 do not exceed a spectral range of about 120 degrees. In contrast, in the example discussed in connection with hue wheel 800 of FIG. 8, the colors selected for the various roads 21–26 are distributed over a spectral range which is slightly larger than 120 degrees. As shown in FIG. 9, the roads, such as the interstate and country roads, are on the same side of the background on the hue wheel 900, so that the colors for the roads are in one direction from the location of the background on the hue circle In the color assignments shown, a respective discrete color has been assigned to an item of map information, such as a road 21, and another discrete color has been assigned to an item of additional information, such as a road border 22. However, it is also possible to assign a plurality of colors within a preferably narrow spectral range so that the color contrast may be reduced over a plurality of color steps.

The ergonomic map information system 1 may include a method for controlling the construction of a map portion. The method may be implemented in software or electromagnetic signals, which, referring to FIG. 1, may be stored in memory 4 of ergonomic map information system 1 and processed by processor 3 and/or graphics control unit 5.

Figure 10:
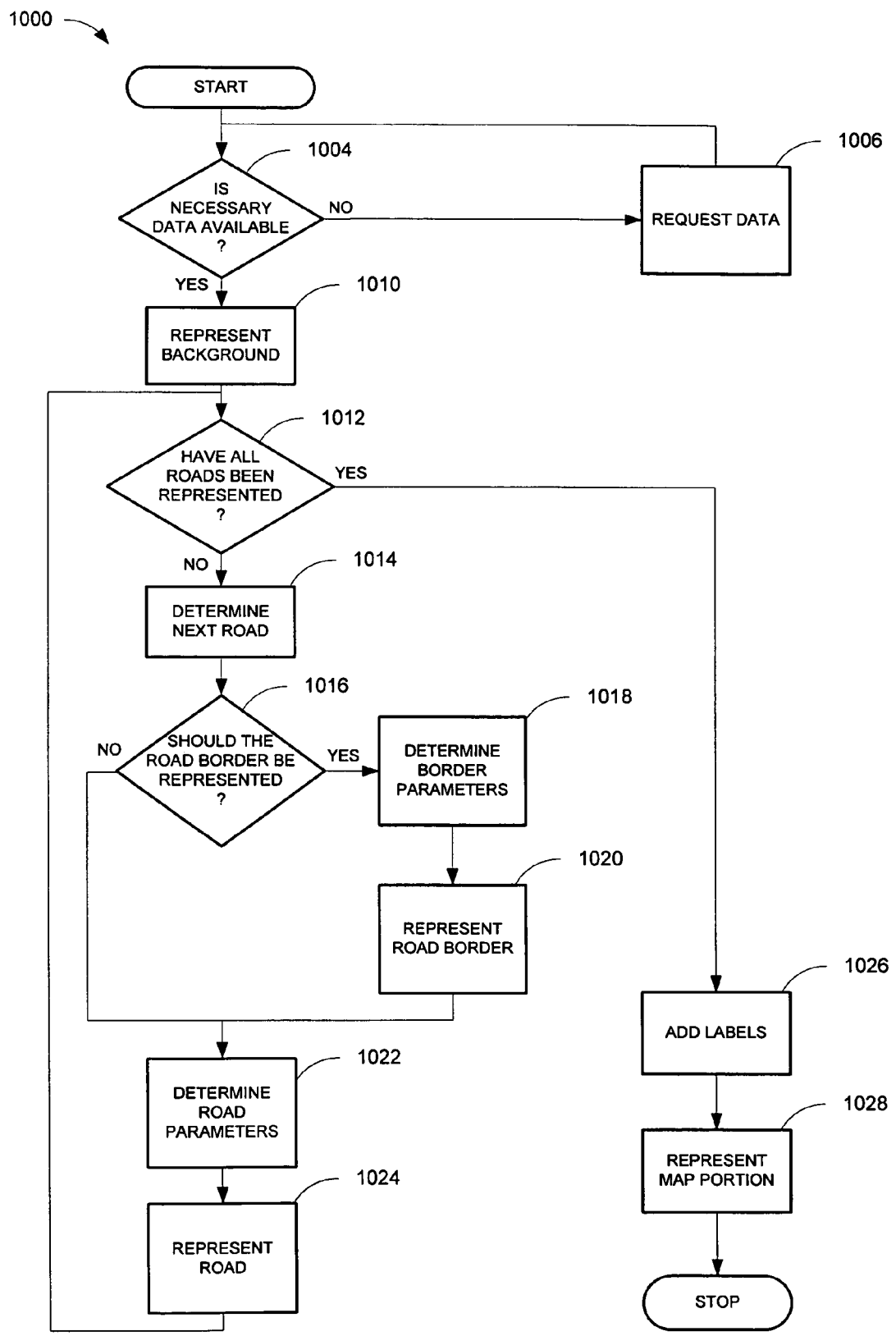
FIG. 10 is a flow chart of a method for controlling the representation of a map portion.

An example of a method for controlling the representation of a map portion 1000 is shown in FIG. 10. The method 1000 may be initiated, for example, by a request from a user for the map portion. Further, the method 1000 may be initiated automatically. For example, if the ergonomic map information system is implemented in a vehicle, a detected change in vehicle position may precipitate the need and request for a particular map portion. The description of the method 1000 will be made with reference to FIGS. 10 and 1.

Initially, in the method for controlling the construction of a map portion 1000, a determination is made as to whether all the map data needed to create a representation of the requested map portion are already available 1004 in the display control unit 2. If not, data may be requested 1006 from the memory 4 in the ergonomic map representation system 1 and/or from the memory 10 in the navigation system 8. Steps 1004 and 1006 may be repeated until all data are available. When all data are available, a representation of the background may be created 1010. Then, a determination is made as to whether all the roads included in the requested map portion have been represented 1012. If all the roads included in the requested map portion have been represented, labels may be added 1026, and the map portion may be represented 1028 on the interface 6.

If, however, it is determined in step 1012 that all the roads have not been represented, one of the roads not yet represented may be determined 1014. For this purpose, it may be determined whether the road is to be provided with a road border 1016. If it is determined that the road is to be provided with a road border, parameters for the road border, such as road border width and color, may be determined 1018. The road border may then be represented 1020. After the road border is represented 1020, or after it is determined in step 1016 that the road is not to be provided with road borders, parameters for the representation of the associated roads (the "road parameters"), such as road width and color, are determined 1022. Thereafter, the road may be represented 1024. The method 1000 may be repeated from step 1012, as appropriate, until it is determined in step 1012 that there are no more roads to be represented. At this point, labels may be added 1026, for example, to the roads, and the map portion may be represented 1028. In addition, prior to representing the map portion, an optional step (not shown) that includes adding additional items of map information, such as a scale, directional arrow, or symbols identifying important traffic points or places or objects of interest.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for optically representing a map portion, comprising:
    selecting a first color for a background; and
    selecting a second color for a map information, the second color being different from the first color,
    where at least one of the selecting of the first color or selecting of the second color is automatic and where at least one of the selecting of the first color or selecting of the second color is dependent on the selecting of the second color or selecting of the first color so that the background and the map information are represented in an optically ergonomic manner.

2. The method of claim 1, where automatically selecting the second color is dependent the first color.

3. The method of claim 1, where the first and second colors include gray values.

4. The method of claim 1, where selecting the second color includes selecting a color within a color contrast of the first color.

5. The method of claim 4, where the color contrast does not exceed about 120 degrees on a hue circle.

6. The method of claim 1, further comprising selecting a third color for additional information, where the third color is located between the first color and the second color on a hue circle.

7. The method of claim 6, where the third color is located more closely to the second color on the hue circle.

8. The method of claim 1, where the first color for the background is at a location on a hue circle;
    where the map information includes roads; and
    where colors for the roads is in one direction from the location of the first color on the hue circle.

9. The method of claim 1, where the first color for the background is at a location on a hue circle;
    where the map information includes a first road and a second road; and
    where a color for the first road is on one side of the location on the hue circle and a color for the second road is on an opposite side of the location on the hue circle.

10. The method of claim 1, where the map information defines one or more elements and thinner elements are represented with a comparatively more intensive color than thicker elements.

11. The method of claim 1, where the second color is selected based on a selected scale of the map portion.

12. The method of claim 1, where, depending on a selected scale of the map portion, strength of graphic representation of a map information is varied such that in a case of a large scale a great strength of graphic representation is chosen, whereas in a case of a small scale a small strength of graphic representation is chosen.

13. The method of claim 1, where the map portion includes additional information, the map information includes a parameter, and the method further includes epresenting the additional information as a function of at least one of the parameter and a selected scale.

14. The method of claim 13, where the additional information includes road borders; and
    where the parameter includes road width or color.

15. The method of claim 1, where the map portion includes a transition between the first and second colors, and the method further includes smoothing the transition.

16. The method of claim 1, where the map portion includes a label, and the method further includes orienting the label based the map information.

17. The method of claim 16, where the map information includes a road with a course; and
    where orienting the label includes orienting the label so that the label follows the course of the road associated with the label.

18. The method of claim 16, where the label is oriented orthogonally to a tangent of the map information.

19. A map information system for producing an ergonomic representation of a map portion, comprising:
    a processor; and
    a memory in communication with the processor and including:
    a data module configured to store map data; and
    an adaptation module configured to produce the ergonomic representation of the map portion from the map data by:
    selecting a first color for a first part of the map data; and
    selecting a second color for a second part of the map data, the second color being different from the first color,
    where at least one of the selecting of the first color or selecting of the second color is automatic and where at least one of the selecting of the first color or selecting of the second color is dependent on the selecting of the second color or selecting of the first color.

20. The system of claim 19, where the adaptation module includes computer-executable instructions implemented in a computer-readable medium, the computer-executable instructions defining logic for producing an ergonomic representation of a map portion.

21. The system of claim 19, where the adaptation module includes computer-executable instructions implemented in an electromagnetic signal, the computer-executable instructions defining logic for producing an ergonomic representation of a map portion.

22. The method of claim 1, further comprising at least one dynamic aspect for optically representing the map portion; and
    where at least one of the selecting of the first color or selecting of the second color is based on the dynamic aspect so that the background and the map information are represented in an optically ergonomic manner.

23. The method of claim 22, where the dynamic aspect comprises a selected scale of representation of the map portion.

* * * * *